(12) United States Patent
Lee et al.

(10) Patent No.: US 8,288,500 B2
(45) Date of Patent: Oct. 16, 2012

(54) SULFONATED POLY(ARYLENE ETHER) COPOLYMERS AND RELATED POLYMER ELECTROLYTE MEMBRANES AND FUEL CELLS

(75) Inventors: Ju Ho Lee, Incheon (KR); Dong Ii Kim, Incheon (KR); Nak Hyun Kwon, Seoul (KR); Inchul Hwang, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 12/917,772

(22) Filed: Nov. 2, 2010

(65) Prior Publication Data

US 2011/0136041 A1     Jun. 9, 2011

(30) Foreign Application Priority Data

Dec. 4, 2009   (KR) ................ 10-2009-0120133

(51) Int. Cl.
*C08G 8/02*   (2006.01)

(52) U.S. Cl. ........ 528/125; 528/171; 528/295; 528/220; 528/373; 521/27; 429/479; 429/480; 429/498; 429/493; 429/429

(58) Field of Classification Search ................ 528/125, 528/171, 295, 220, 373; 521/27; 429/479, 429/480, 498, 493, 429
See application file for complete search history.

(56) References Cited

U.S. PATENT DOCUMENTS

2004/0137297 A1 * 7/2004 Matsuoka et al. ............. 429/30
2009/0203806 A1 * 8/2009 Liu et al. ........................ 521/27

FOREIGN PATENT DOCUMENTS

| CA | 2047381 | * | 7/1991 |
| JP | 04-233939 A | | 8/1992 |
| JP | 2003-147074 A | | 5/2003 |
| KR | 10-0748049 B1 | | 8/2007 |

* cited by examiner

*Primary Examiner* — Shane Fang
(74) *Attorney, Agent, or Firm* — Edwards Wildman Palmer LLP; Peter F. Corless (57) ABSTRACT

The present invention relates to a sulfonated poly(arylene ether) copolymer, a manufacturing method thereof and a polymer electrolyte membrane for fuel cell using the same.

24 Claims, 3 Drawing Sheets

SULFONATED POLY(ARYLENE ETHER) COPOLYMERS AND RELATED POLYMER ELECTROLYTE MEMBRANES AND FUEL CELLS

CROSS-REFERENCE TO RELATED APPLICATION

This application claims priority to and the benefit of Korean Patent Application No. 10-2009-0120133 filed in the Korean Intellectual Property Office on Dec. 4, 2009, the entire contents of which are incorporated herein by reference.

BACKGROUND OF THE INVENTION (a) Field of the Invention

The present invention relates to a sulfonated poly(arylene ether) copolymer, a manufacturing method thereof and a polymer electrolyte membrane for fuel cell using the same.

(b) Description of the Related Art

A fuel cell is an energy converting device that can convert chemical energy into electrical energy by an electrochemical reaction between hydrogen or methanol, which is a fuel, and oxygen or air, which is an oxidizing agent. A fuel cell may include a fuel electrode (anode), an oxygen electrode (cathode) and an electrolyte membrane that is disposed between the two electrodes. Such a configuration is called a membrane-electrode assembly. In such an assembly, the electrolyte membrane can facilitate transport of a hydrogen ion that is generated at the fuel electrode to the oxygen electrode (the conductivity of the hydrogen ion is high) and a role as a partition for preventing fuel from being mixed with oxygen (dimensional stability to hydration is high and the methanol transmissivity is low).

Such polymer electrolyte membranes (PEMs) can be classified as fluorinated PEMs and hydrocarbon-based PEMs. Hydrocarbon-based electrolyte membranes can be produced with polymers such as polyimide (PI), polysulfone (PSU), polyetherketone (PEK), polyarylene ethersulfone (PAES) and the like. Hydrocarbon-based electrolyte membranes can provide advantages of low manufacturing costs and good thermal stability relative to fluorinated electrolyte membranes.

However, to provide hydrogen ion conductivity in a hydrocarbon-based electrolyte membrane comparable to that of a fluorinated membrane, a hydrophilic ion group such as a sulfonic acid group and the like can be introduced into a hydrocarbon-based electrolyte membrane. However, introducing such hydrophilic ion groups can deteriorate mechanical properties because of excessive swelling due to moisture and, which can lower the membrane stability and result in the problem of elution of a portion of sulfonated resin.

To address this problem, water solubility of the electrolyte membrane can be lowered by introducing a crosslinking structure to a raw material resin by covalent bonding to suppress elution of the resin, or fluidity of the polymer chain can be increased by introducing the sulfonic acid group into the side chain of the polymer rather than the main chain of the polymer to improve the conductivity of the hydrogen ion. However, these approaches also present drawbacks including that the conductivity of the hydrogen ion can be undesirably low; in the case of the crosslinking approach, the crosslinking of a large polymer can be synthetically difficult, a membrane manufacturing process using the crosslinked polymer also can be difficult, and mechanical properties of the membrane may not be sufficient because the fluidity of the polymer can be lowered due to an increase in the polymer glass transition temperature (Tg).

The above information disclosed in this Background section is only for enhancement of understanding of the background of the invention and therefore it may contain information that does not form the prior art that is already known in this country to a person of ordinary skill in the art.

SUMMARY OF THE INVENTION

One aspect of the invention provides new poly(arylene ether) copolymers. Preferred polymers of the invention can provide desirable mechanical properties as well as high hydrogen ion conductivity.

An embodiment of the present invention provides a method for manufacturing the copolymer.

Another embodiment of the present invention provides a polymer electrolyte membrane using the copolymer.

Another embodiment of the present invention provides a poly(arylene ether) copolymer that is represented by Formula 1:

[Formula 1]

wherein,

R is a hydrogen atom or a sulfonic acid group ($-SO_3^-M^+$), $M_+$ is a positive ion such as lithium, sodium or potassium, each $Ar_1$ is each independently one or more substituent groups that are selected from the group consisting of the following Formula 4a,

[Formula 4a]

Ar₂ is each independently one or more substituent groups that are selected from the group consisting of the following Formula 5a,

[Formula 5a]

X is in the range of 0.01 to 1.0, n is an integer in the range of 10 to 800.

Another embodiment of the present invention provides a method for manufacturing a sulfonated poly(arylene ether) copolymer, which comprises the steps of a) copolymerizing (i) 1,2-bis(4-hydroxyphenyl)-1,2-diphenylethylene, (ii) one or more monomers that are selected from the group consisting of the following Formula 4b, and (iii) one or more monomers that are selected from the group consisting of the following Formula 5b to thereby form a resin, and then preferably b) introducing a sulfonic acid group to the resin:

[Formula 4b]

[Formula 5b]

In the Formula 4b, each X is the same or different halogen group such as F, Cl, Br or I.

Yet another embodiment of the present invention provides a polymer electrolyte membrane using the copolymer.

We have found, among other things, that through a method of copolymerizing a dihydroxy monomer and dihalide monomer and sulfonating them, it is possible to manufacture a polymer that is designed so that the side chain length of the hydrophilic portion of the copolymer is relatively long and the sulfonic acid group is dense, the introduction amount of the sulfonic acid group can be easily controlled through a change in equivalent of the sulfonating agent, the polymer can be manufactured by a simplified method, and the polymer electrolyte membrane that is manufactured by using the polymer can have high hydrogen ion conductivity in an environment having of low moisture content, and shows high dimensional stability even if it is exposed to moisture for a long time.

The poly(arylene ether) copolymer according to an embodiment of the present invention is represented by the following Formula 1:

[Formula 1]

wherein

R is a hydrogen atom or a sulfonic acid group (—SO$_3^-$M$^+$), M$_+$ is a positive ion,

Ar$_1$ is each independently one or more substituent groups that are selected from the group consisting of the following Formula 4a,

[Formula 4a]

Ar$_2$ is each independently one or more substituent groups that are selected from the group consisting of the following Formula 5a,

[Formula 5a]

X is in the range of 0.01 to 1.0,
n is an integer in the range of 10 to 800,

In certain preferred aspects, in Formula 1, n is 20 to 800. In addition, X is preferably 0.1 to 0.9, and more preferably 0.2 to 0.8.

Particularly, the sulfonated poly(arylene ether) copolymer according to a preferred embodiment of the present invention is represented by the following Formula 3:

[Formula 3]

In the Formula 3, Ar$_1$, Ar$_2$, X and n are the same as those of Formula 1.

In certain preferred aspects, and without being bound by theory, in the main chain of the polymer, the hydrophilic portion can facilitate transporting a hydrogen ion, and the hydrophobic portion can facilitate supporting physical properties of a membrane, and the performance of the polymer membrane can depend at least in part on the structure of the hydrophilic portion and hydrophobic portion.

Thus, in the case of a preferred polymer of Formula 3, the sulfonated poly(arylene ether) copolymer can be designed so that the side chain length of the hydrophilic portion is relatively long and the sulfonic acid group is dense. Again without being bound by theory, such a polymer structure configuration can provide dimensional stability to moisture through formation of effective ion channels and high hydrogen ion conductivity and relatively widening the hydrophobic portion.

The sulfonated poly(arylene ether) copolymer may be manufactured by sulfonating the poly(arylene ether) copolymer that is represented by the following Formula 2, and the manufacturing method thereof is further disclosed herein.

[Formula 2]

In the Formula 2, $Ar_1$, $Ar_2$, X and n are the same as those of Formula 1.

The poly(arylene ether) copolymer of Formulas 1 to 3 according to the present invention suitably may be e.g. a random copolymer or block copolymer.

The molecular weight of the poly(arylene ether) copolymer of the Formulas 1 to 3, may suitably may vary widely and preferably, the weight average molecular weight may be 10,000 to 1,000,000, and more preferably 30,000 to 800,000. Optimal polymer molecular weights for any particular system may suitably be assessed by simple testing, e.g. by analysis of mechanical properties and hydrogen ion conductivity of a polymer.

According to another embodiment, the present invention provides a manufacturing method of the sulfonated poly (arylene ether) copolymer, the method suitably comprising the steps of:

a) copolymerizing 1,2-bis(4-hydroxyphenyl)-1,2-diphenylethylene, one or more monomers that are selected from the group consisting of the following Formula 4b, and one or more monomers that are selected from the group consisting of the following Formula 5b, and b) introducing a sulfonic acid group to the copolymerized polymer:

[Formula 4b]

[Formula 5b]

wherein, X is an atom that is each independently selected from a halogen group.

Various steps of manufacturing methods of the present invention are described as follows. However, it will be understood that these descriptions are exemplary only, and that additional steps may be included in a method of the invention and/or one or more of the described steps may be omitted or modified.

a) The Step for Copolymerizing the Monomer

Step a) includes polycondensation of the monomers to synthesize the poly(arylene ether) copolymer according to Formula 2, and is suitably performed for example through reaction(s) that may comprise a nucleophilic substitution reaction via an activation step and a polymerization step. The nucleophilic substitution reaction can be performed under generally known conditions which are not particularly limited.

In the step a) step, the X value of Formula 3 may be determined according to the content ratio of each monomer, and preferably the equivalent ratio of one or more monomers that are selected from the group consisting of Formula 4b: 1,2-bis(4-hydroxyphenyl)-1,2-diphenylethylene: one or more monomers that are selected from the group consisting of Formula 5b may be 1:0.05 to 0.95:0.05 to 0.95, and more preferably 1:0.2 to 0.8:0.2 to 0.8.

According to an embodiment of the present invention, the contents or amounts of the monomers may be controlled and added in the range where the sum total of the mole number of [1,2-bis(4-hydroxyphenyl)-1,2-diphenylethylene] and the mole number of one or more monomers that are selected from the group consisting of Formula 5b is the same as the mole number of one or more monomers that are selected from the group consisting of Formula 4b. In more detail, for example, the equivalent ratio of one or more monomers that are selected from the group consisting of Formula 4b: [1,2-bis(4-hydroxyphenyl)-1,2-diphenylethylene]: one or more monomers that are selected from the group consisting of Formula 5b may be (1:0.95:0.05), (1:0.9:0.1), (1:0.85:0.15), (1:0.8:0.2), (1:0.75:

0.25), (1:0.7:0.3), (1:0.65:0.35), (1:0.6:0.4), (1:0.55:0.45), (1:0.5:0.5), (1:0.45:0.55), (1:0.4:0.6), (1:0.35:0.65), (1:0.3: 0.7), (1:0.25:0.75), (1:0.2:0.8), (1:0.15:0.85), (1:0.1:0.9), or (1:0.05:0.95). It will be understood, however, that these equivalent ratios are exemplary only and are non-limiting.

In addition, the step a) may be performed in the presence of one or more solvents that for example are suitably selected from the group consisting of dimethylacetamide, N-methylpyrrolidone, dimethylformamide, dimethyl sulfoxide, methylene chloride, chloroform, tetrahydrofuran, benzene, toluene and xylene.

According to a preferred embodiment of the present invention, the step a) may be performed by mixing the monomers in one or more solvents such as those disclosed above, performing the activation step at 100 to 180° C. for 2 to 4 hours, gradually increasing the temperature to 120 to 200° C., performing the polymerization reaction for 12 to 48 hours, then washing the resultant polymer with one or more solvents, and drying the washed polymer.

In addition, if necessary or desired, a step for oxidizing the manufactured copolymer may be further performed. That is, in the sulfonating step described below, in the case of when the sulfonic acid group is introduced to an undesirable site of the main chain of the copolymer, the polymer electrolyte membrane comprising such a polymer may exhibit lower dimensional stability and the uniformity of the membrane can be reduced because of a difference in partial ion conductivity between the membranes. Accordingly, in such instances, where there is a site to which the sulfonic acid group is easily introduced in addition to the R site of the Formula 1, it can be preferred to perform a further and subsequent oxidizing step to incorporate a sulfonic acid group on the polymer.

According to one embodiment of the present invention, in the case of when the copolymer is manufactured by using 4,4'-thiodiphenol as one or more monomers that are selected from the group consisting of Formula 5b and the copolymer is directly sulfonated, the sulfonation may occur at an undesired site (specifically, 4,4'-thiodiphenol site) other than R of Formula 1. To promote the desired sulfonation, it can be preferable to oxidize the 4,4'-thiodiphenol site before the sulfonation reaction.

Oxidation of the copolymer can be performed by a wide variety of methods. In one preferred oxidation protocol, the copolymer can be dissolved in one or more organic solvents with addition of a suitable oxidizing agent such as methachloroperoxybenzoic acid, to thereby perform the oxidation reaction.

b) The Step for Introducing a Sulfonic Acid Group to the Copolymerized Polymer

Step b) includes performing the sulfonation reaction of the poly(arylene ether) copolymer according to Formula 2 to manufacture the sulfonated poly(arylene ether) copolymer according to Formula 3.

The sulfonating reaction may be performed for example by reacting the copolymer with a sulfonic acid compound. A variety of sulfonic acid compounds may be employed in the sulfonating reaction including for example one or more compounds selected from the group consisting of concentrated sulphuric acid ($H_2SO_4$), chlorosulfonic acid ($ClSO_3H$), fuming sulfuric acid (fuming $SO_3$) and fuming sulfuric acid triethylphosphate salt ($SO_3$-TEP).

This step b) may be conducted within a wide range of reaction temperatures for example at 0 to 100° C., and preferably 25 to 50° C.

According to an embodiment of the present invention, the step b) may be performed by dissolving the copolymer that is synthesized in step a) in one or more solvents, adding the sulfonic acid compound thereto and continuing the reaction for a suitable reaction time such as m for 1 to 5 hours, and filtering and drying the product.

According to another embodiment, the present invention provides a polymer electrolyte membrane that includes the sulfonated poly(arylene ether) copolymer.

The polymer electrolyte membrane may be suitably manufactured through known methods, except that the sulfonated poly(arylene ether) copolymer according to the present invention is used.

For example, in a preferred method, a polymer electrolyte membrane may be manufactured by dissolving the sulfonated poly(arylene ether) copolymer in one or more organic solvents such as dimethylacetamide, dimethylacrylic acid (DMAc), N-methyl-2-pyrrolidone (NMP), and dimethylformamide (DMF), casting it on the glass plate and drying it at for example 80 to 160° C.

A polymer electrolyte membrane of the invention also may comprise further components in addition to a sulfonated poly(arylene ether) copolymer according to the present invention. Such additional components may be suitably added with a sulfonated poly(arylene ether) polymer in the manufacturing process of a polymer electrolyte membrane.

According to an embodiment of the present invention, in addition to the poly(arylene ether) copolymer, as the proton conductive polymer, one or more polymers selected from the group consisting of polyimide, polyetherketone, polysulfone, polyethersulfone, polyetherethersulf one, polybenzimidazole, polyphenyl oxide, polyphenylene sulfide, polystyrene, polytrifluorostyrene sulfonic acid, polystyrene sulfonic acid, polyurethane and branched sulfonated polysulfoneketone copolymer may be further included in a polymer electrolyte membrane together with one or more poly(arylene ether) copolymers.

One or more inorganic materials that are selected from the group consisting of silicon oxide $SiO_2$, titanium oxide $TiO_2$, inorganic phosphoric acid, sulfonated silicon oxide (Sulfonated $SiO_2$), sulfonated zirconium oxide (sulfonated ZrO) and sulfonated zirconium phosphate (sulfonated ZrP) may be further included in a polymer electrolyte membrane together with one or more poly(arylene ether) copolymers.

The polymer electrolyte membrane of the present invention may be suitably used in a Membrane-Electrode Assembly that includes a fuel electrode (anode), an oxygen electrode (cathode) and an electrolyte membrane that is disposed between the two electrodes. Such components of a Membrane-Electrode Assembly are not in general particularly limited.

Since the polymer electrolyte membrane is manufactured by using the sulfonated poly(arylene ether) copolymer according to the present invention, thermal and chemical stability, and processability can be excellent, high hydrogen ion conductivity can be provided due to the substituted sulfonic acid group, and even if the system is exposed to moisture for extended time periods, there can be little change in electrolyte membrane characteristics, such that high dimensional stability can be exhibited. Thus, polymer electrolyte membranes of the invention can provide excellent performance properties and can be highly useful in battery fields such as for use as a fuel battery or rechargeable battery.

In certain preferred aspects, a sulfonated poly(arylene ether) copolymer according to the present invention can be provided with an extended (long) side chain length of the hydrophilic portion and relatively high density of sulfonic acid groups. Additionally, polymer membranes of the invention can provide dimensional stability to moisture through forming effective ion channels and relatively widening the hydrophobic portion.

In addition, through preferred manufacturing methods of the present invention, the introduction amount of the sulfonic acid group can be easily controlled through a change in equivalent of the sulfonating agent, the polymer can be manufactured by a simplified method, and the polymer electrolyte membrane that is manufactured by using the polymer can have a relatively high hydrogen ion conductivity in an environment having low moisture content, and can exhibit high dimensional stability even if it is exposed to moisture for extended time periods, such that the produced polymer electrolyte membranes can be highly useful including as fuel cells.

Additionally, systems of the invention are highly useful in vehicles including motor vehicles such as automobiles (which includes passenger vehicles, buses, commercial vehicles, etc.), particularly vehicles that utilize a fuel cell.

Other aspects of the invention are disclosed infra.

DETAILED DESCRIPTION

Preferred examples are herein described. However, the following Examples are set forth to illustrate and should not to be construed to limit the present invention.

Example 1 a) Manufacturing of Poly(Arylene Ether) Copolymer (X=0.25)

(Reaction Equation 1-a)

Under a nitrogen atmosphere, in equipment that included a condenser Dean-Stark trap and a magnetic stirrer bar, 4,4'-difluorodiphenylsulfone [20 mmol], 1,2-bis(4-hydroxyphenyl)-1,2-diphenylethylene [5 mmol) and 4,4'-thiodiphenol [15 mmol] were added as monomers to a two-neck round bottom flask, and potassium carbonate (24 mmol) was added thereto. At this time, dimethylacetamide (70 mL) and toluene (50 mL) were added thereto as the reaction solvent.

The activation step was performed at the reaction temperature of 140° C. for 4 hours, and in the reaction, water that was manufactured as the byproduct was removed by toluene which was the reaction solvent. The polymerization reaction was performed for 24 hours by gradually increasing the temperature to 165° C. After the reaction was finished, it was washed several times with methanol/water (volume ratio=1:1), and vacuum dried at 60° C. for 24 hours.

Figure 1:
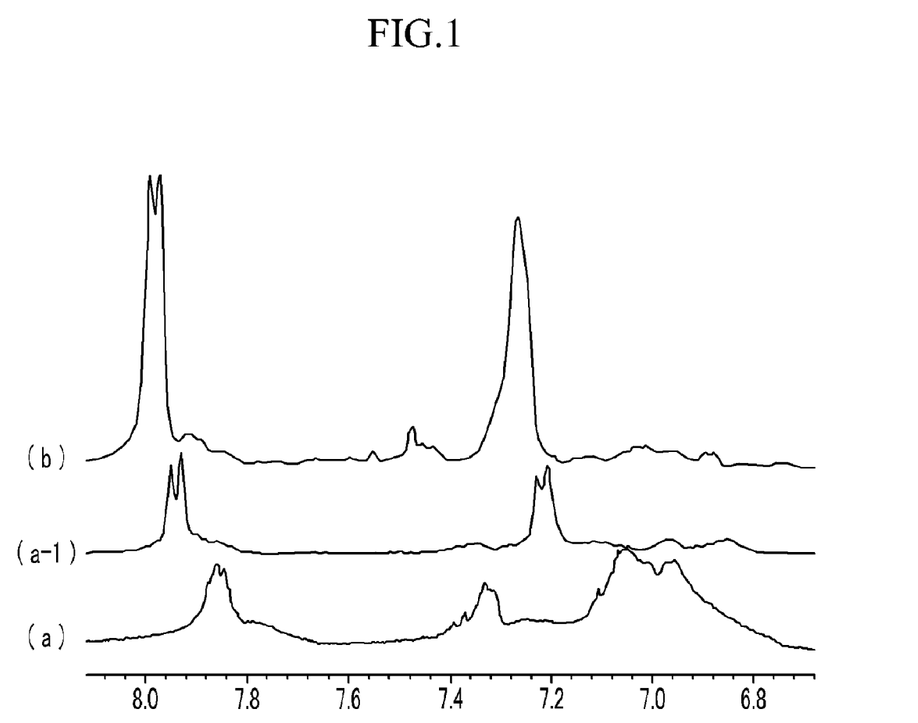
FIG. 1 is a graph that illustrates a nuclear magnetic resonance (NMR) spectrum in respects to the final product that is obtained in each step of Example 1 according to the present invention.

The final product was obtained in a white solid form (yield: 97%), and $^1$H-NMR was performed to analyze the structure, and the results thereof are shown in FIG. 1.

a-1) Oxidation of Poly(Arylene Ether) Copolymer

After 5 g of copolymer was dissolved in 100 mL of dichloromethane 100 mL, 5 g of m-chlor-peroxybenzoic acid (MCPBA) was mixed therewith. Subsequently, after it was reacted at room temperature for 6 hours, it was precipitated by pouring the reaction solution into methanol. Thereafter, it was washed with methanol 3 times, vacuum dried at 120° C. to obtain the final product (yield: 95%).

The final product was subjected to $^1$H-NMR to analyze the structure, and the results thereof are shown in FIG. 1. It was confirmed that the known peak was removed while the peak of benzene hydrogen of Ar—S—Ar at around 6.9 ppm was changed to sulfone $SO_2$, and it was synthesized through the area ratio comparison thereof.

(Reaction Equation 1-a-1)

b) Manufacturing of Sulfonated Poly(Arylene Ether) Copolymer (Reaction Equation b)

Under a nitrogen atmosphere, in 100 mL flask that was provided with the condenser and the magnetic stirrer bar, 5 g of the polymer that was obtained in step (a-2) was dissolved in 60 mL of concentrated sulfuric acid, and reacted at 45° C. for 12 hours. Subsequently, the polymer was precipitated by pouring the reaction solution on distilled water. Next, the remaining sulfuric acid was removed by washing the precipitated polymer with distilled water several times. The final product was obtained by vacuum drying the polymer that was purified at 120° C. (yield: 94%).

The final product was subjected to $^1$H-NMR to analyze the structure, and the results thereof are shown in FIG. 1. The peak was generated at around 7.50 ppm while the sulfonic acid group was introduced to the copolymer, which meant that hydrogen at the alpha position of the sulfonic acid group became the down field, and through the area ratio, it was confirmed that the synthesis was accomplished.

The copolymer was manufactured by using the same condition and method as step (a) of Example 1, except that the molar ratio of the monomers was set so that 4,4'-difluorodiphenylsulfone [20 mmol], 1,2-bis(4-hydroxyphenyl)-1,2-diphenylethylene [6 mmol] and 4,4'-thioldiphenol [14 mmol] were added. The final product was obtained in a white solid form (yield: 95%), and $^1$H-NMR was performed to analyze the structure, and the results thereof are shown in FIG. 1.

a-1) Oxidation of Poly(Arylene Ether) Copolymer

Example 2 a) Manufacturing of Poly(Arylene Ether) Copolymer (X=0.3)

(Reaction Equation 2-a)

(Reaction Equation 2-a-1)

The oxidation reaction of the copolymer was performed by using the same condition and method as step (b) of Example 1, except that the copolymer that was synthesized in step (a) was used (yield: 93%).

Figure 2:
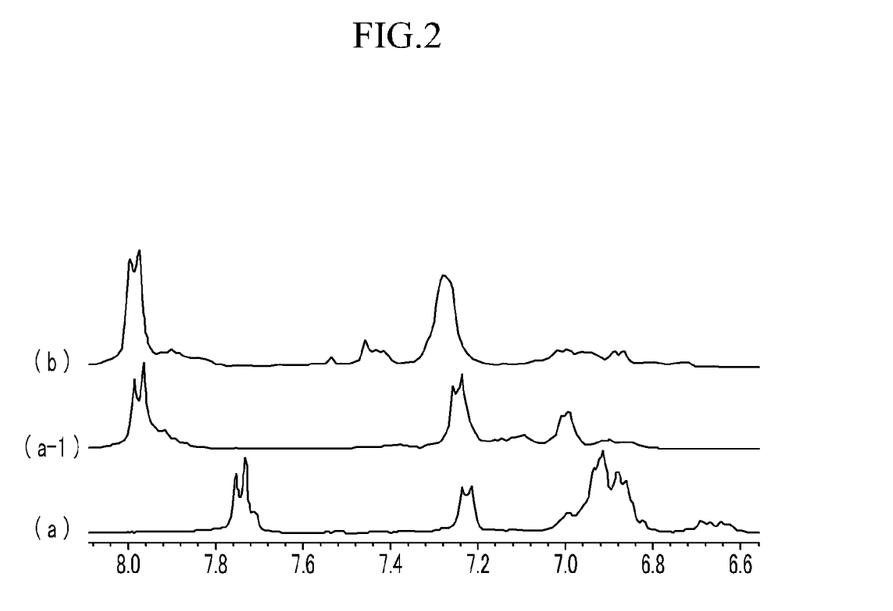
FIG. 2 is a graph that illustrates a nuclear magnetic resonance (NMR) spectrum in respects to the final product that is obtained in each step of Example 2 according to the present invention.

The final product was subjected to $^1$H-NMR to analyze the structure, and the results thereof are shown in FIG. 2. It was confirmed that the known peak was removed while the peak of benzene hydrogen of Ar—S—Ar at around 6.9 ppm was changed to sulfone $SO_2$, and it was synthesized through the area ratio comparison thereof.

b) Manufacturing of Sulfonated Poly(Arylene Ether) Copolymer (Reaction Equation 2-b)

The sulfonated copolymer was performed by using the same condition and method as step (b) of Example 1, except that the copolymer that was synthesized in step (a-2) was used.

The final product was subjected to $^1$H-NMR to analyze the structure, and the results thereof are shown in FIG. 2. The peak was generated at around 7.50 ppm while the sulfonic acid group was introduced to the copolymer, which meant that hydrogen at the alpha position of the sulfonic acid group became the down field, and through the area ratio, it was confirmed that the synthesis was accomplished.

Example 3 a) Manufacturing of Poly(Arylene Ether) Copolymer (X=0.3)

b) Manufacturing of Sulfonated Poly(Arylene Ether) Copolymer (Reaction Equation 3-a)

The copolymer was manufactured by using the same condition and method as step (a) of Example 1, except that 4,4'-difluorodiphenylsulfone [20 mmol], 1,2-bis(4-hydroxyphenyl)-1,2-diphenylethylene [6 mmol] and bis(4-hydroxy-3,5-dimethylphenyl) sulfone [14 mmol] were used as the monomer. The final product was obtained in a white solid form (yield: 95%), and $^1$H-NMR was performed to analyze the structure, and the results thereof are shown in FIG. 3.

(Reaction Equation 3-b)

The sulfonated copolymer was performed by using the same condition and method as step (b) of Example 1, except that the copolymer that was synthesized in step (a) was used (yield: 94%).

Figure 3:
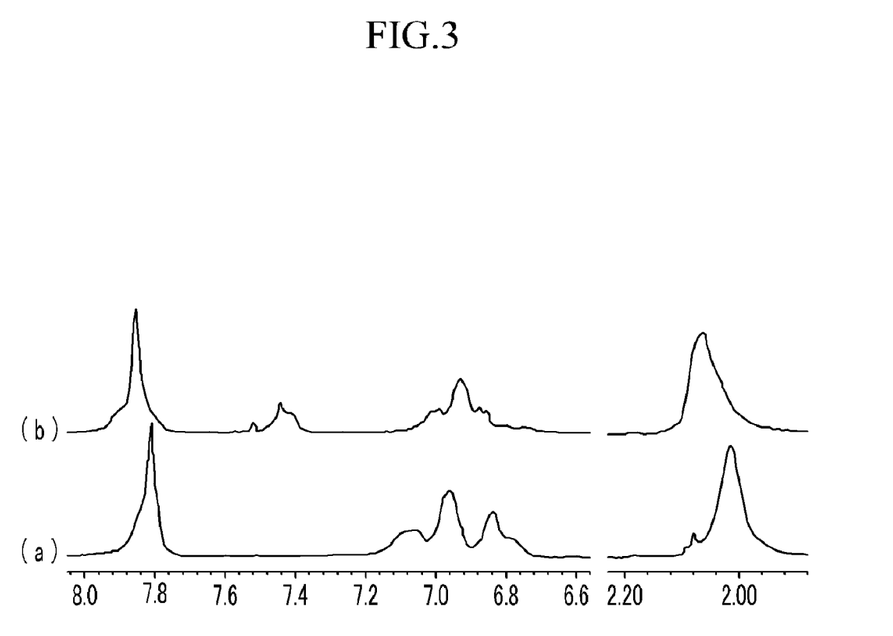
FIG. 3 is a graph that illustrates a nuclear magnetic resonance (NMR) spectrum in respects to the final product that is obtained in each step of Example 3 according to the present invention.

The final product was subjected to $^1$H-NMR to analyze the structure, and the results thereof are shown in FIG. 3. The peak was generated at around 7.50 ppm while the sulfonic acid group was introduced to the copolymer, which meant that hydrogen at the alpha position of the sulfonic acid group became the down field, and through the area ratio, it was confirmed that the synthesis was accomplished.

Preparation Example 1

Manufacturing of the Positive Ion Exchange Polymer Electrolyte Membrane

The sulfonated poly(arylene ether) copolymer that was manufactured in step (b) of Example 1 was dissolved in dimethylacetamide, cast on the glass plate, and dried at 120° C. to manufacture the polymer electrolyte membrane.

Preparation Example 2

Manufacturing of the Positive Ion Exchange Polymer Electrolyte Membrane

The polymer electrolyte membrane was manufactured by using the same method as Preparation Example 1, except that the sulfonated poly(arylene ether) copolymer that was manufactured in step (b) of Example 2 was used.

Preparation Example 3

Manufacturing of the Positive Ion Exchange Polymer Electrolyte Membrane

The polymer electrolyte membrane was manufactured by using the same method as Preparation Example 1, except that the sulfonated poly(arylene ether) copolymer that was manufactured in step (b) of Example 3 was used.

Comparative Example

The positive ion exchange polymer electrolyte membrane (Manufacturing company: DuPont, trademark: Nafion-211) that was commercially sold was prepared.

Experimental Example

Measurement of the Molecular Weight and Dispersibility of the Copolymer

The weight average molecular weight (Mw) and dispersibility (PDI=Mw/Mn) of the sulfonated poly(arylene ether) copolymer manufactured in Examples 1 to 3 were measured by using chromatography, and the results thereof are described in the following Table 1. The equipment and condition used in the measurement are described below.
GPC: Waters, Co., Ltd., model name 2414
Column: Waters, Co., Ltd., model name HR 3, 4, 5 column temperature: 80° C./elution solvent: dimethylformamide/ elution speed: 1 ml/min
standard material: polymethylmethacrylate (PMMA)
The Degree of Sulfonation of the Copolymer
The degree of sulfonation (%) of the sulfonated poly (arylene ether) copolymer manufactured in Examples 1 to 3 were measured by using the NMR, and the results thereof are described in the following Table 1.
Measurement of the Hydrogen ion Conductivity
The hydrogen ion conductivity of the polymer electrolyte membrane manufactured in Preparation Examples 1 to 3 and the Comparative Example were measured by using the impedance spectroscopy (manufactured by Solartron, Co., Ltd.), and the results thereof are described in the following Table 1.

At this time, the impedance measurement condition was measured at the frequency in the range of 1 Hz to 1 MHz, and the measurement was performed in an in-plane manner, and all tests were performed while the samples were completely wet.

Measurement of the Methanol Transmissivity

After the polymer electrolyte membrane according to Preparation Examples 1 to 3 and the Comparative Example was disposed between two cells, 15 mL of 1M methanol aqueous solution was injected into one cell, 15 mL of distilled water was injected into the other cell, 10 μl of samples were collected every 10 min from the cell into which the distilled water was injected, and 10 μl of distilled water was provided again thereto. The methanol concentration of the collected sample was measured by using the gas chromatography.

The change in methanol concentration according to time was recorded by using the graph, methanol transmissivity was calculated from the slope thereof using the following Equation, and the results thereof are described in the following Table 1.

$$\text{Transmissivity [cm}^2\text{/sec]} = \frac{(\text{slope [}ppm/s\text{]} \times \text{Solution volume} \times \text{Electrolyte membrane thickness})}{(\text{Electrolyte membrane area} \times \text{Methanol concentration})}$$
[Equation]

TABLE 1

| Classification | The degree of sulfonation (%) | Weight average molecular weight × 10³ | Dispersibility | Hydrogen ion conductivity (×10⁻³ S/cm) | Methanol transmissivity (×10⁻⁶ cm²/sec) |
|---|---|---|---|---|---|
| Preparation example 1 | 25 | 164 | 1.77 | 3.5 | 0.52 |
| Preparation example 2 | 30 | 173 | 1.89 | 5.8 | 0.91 |
| Preparation example 3 | 30 | 123 | 1.81 | 4.9 | 0.87 |
| Comparative Example | — | — | — | 3.5 | 2.10 |

As shown in Table 1, since the electrolyte membrane according to Preparation Examples 1 to 3 of the present invention is manufactured by using the sulfonated poly(arylene ether) copolymer of Examples 1 to 3, the degree of sulfonation is high and the weight average molecular weight is high. Thus, as compared to the known polymer electrolyte membrane (Comparative Example), the same or higher hydrogen ion conductivity and low methanol transmissivity are shown, such that performance as the polymer electrolyte membrane for fuel cell is excellent.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A poly(arylene ether) copolymer that is represented by Formula 1:

[Formula 1]

wherein,

R is a sulfonic acid group ($-SO_3^-M^+$), $M_+$ is a positive ion, $Ar_1$ is each independently one or more substituent groups that are selected from the group consisting of the following Formula 4a,

[Formula 4a]

Ar₂ is each independently one or more substituent groups that are selected from the group consisting of the following Formula 5a,

[Formula 5a]

X is in the range of 0.01 to 1.0,
n is an integer in the range of 10 to 800.

2. A sulfonated poly(arylene ether) copolymer that is represented by Formula 3:

[Formula 3]

wherein, $Ar_1$, $Ar_2$, X and n are the same as those of Formula 1 of claim 1.

3. The poly(arylene ether) copolymer of claim 1, wherein: the copolymer is a random copolymer or block copolymer.

4. The poly(arylene ether) copolymer of claim 1, wherein: X is in the range of 0.1 to 0.9.

5. The poly(arylene ether) copolymer of claim 1, wherein: X is in the range of 0.2 to 0.8.

6. The poly(arylene ether) copolymer of claim 1, wherein: a weight average molecular weight is in the range of 10,000 to 1,000,000.

7. The poly(arylene ether) copolymer of claim 1, wherein: the weight average molecular weight is in the range of 30,000 to 800,000.

8. A method for manufacturing the sulfonated poly(arylene ether) copolymer according to claim 3, the method comprising the steps of:
   a) copolymerizing 1,2-bis(4-hydroxyphenyl)-1,2-diphenylethylene,
   one or more monomers that are selected from the group consisting of the following Formula 4b, and
   one or more monomers that are selected from the group consisting of the following Formula 5b, and
   b) introducing a sulfonic acid group to the copolymerized polymer:

-continued wherein, X is an atom that is each independently selected from a halogen group.

9. The method for manufacturing the poly(arylene ether) copolymer of claim 8, wherein: the step a) of copolymerizing the monomer is carried out
so that an equivalent ratio of one or more monomers that are selected from the group consisting of Formula 4b: 1,2-bis(4-hydroxyphenyl)-1,2-diphenylethylene: one or more monomers that are selected from the group consisting of Formula 5b is 1:0.05 to 0.95:0.05 to 0.95.

10. The method for manufacturing the poly(arylene ether) copolymer of claim 8, wherein: the step a) of copolymerizing the monomer is carried out
so that an equivalent ratio of one or more monomers that are selected from the group consisting of Formula 4b: 1,2-bis(4-hydroxyphenyl)-1,2-diphenylethylene: one or more monomers that are selected from the group consisting of Formula 5b is 1:0.2 to 0.8:0.2 to 0.8.

11. The method for manufacturing the poly(arylene ether) copolymer of claim 8, wherein: step a) of copolymerizing the monomer is carried out under the presence of one or more solvents that are selected from the group consisting of dimethylacetamide, N-methylpyrrolidone, dimethylformamide, dimethyl sulfoxide, methylene chloride, chloroform, tetrahydrofuran, benzene, toluene and xylene.

12. The method for manufacturing the poly(arylene ether) copolymer of claim 8, comprising the steps of:
a) copolymerizing the monomer;
a-1) oxidizing the copolymer; and
b) introducing the sulfonic acid group to the oxidized copolymer.

13. The method for manufacturing the poly(arylene ether) copolymer of claim 8, wherein: the step b) of introducing the sulfonic acid group to the copolymerized polymer is carried out by using one or more sulfonic acid compounds that are selected from the group consisting of concentrated sulphuric acid ($H_2SO_4$), chlorosulfonic acid ($ClSO_3H$), fuming sulfuric acid (fuming $SO_3$) and fuming sulfuric triethylphosphate salt ($SO_3$-TEP).

14. The method for manufacturing the poly(arylene ether) copolymer of claim 8, wherein: the step b) of introducing the sulfonic acid group to the copolymerized polymer is carried out at a temperature in the range of 0 to 100° C.

15. A polymer electrolyte membrane comprising the sulfonated poly(arylene ether) copolymer that has the sulfonic acid group of claim 2.

16. The polymer electrolyte membrane of claim 15, wherein: the polymer electrolyte membrane further includes at least one of polymer that is selected from the group consisting of polyimide, polyetherketone, polysulfone, polyethersulfone, polyetherethersulfone, polybenzimidazole, polyphenylene oxide, polyphenylene sulphide, polystyrene, polytrifluorostyrene sulfonic acid, polystyrene sulfonic acid, polyurethane and branched-chained sulfonated polysulfoneketone copolymer.

17. The polymer electrolyte membrane of claim 15, wherein: the polymer electrolyte membrane further includes one or more inorganic materials that are selected from the group consisting of silicon oxide $SiO_2$, titanium oxide $TiO_2$, inorganic phosphoric acid, sulfonated silicon oxide (sulfonated $SiO_2$), sulfonated zirconium oxide (sulfonated ZrO) and sulfonated zirconium phosphate (sulfonated ZrP).

18. The polymer electrolyte membrane of claim 15, wherein: the electrolyte membrane is a polymer electrolyte membrane for a fuel cell.

19. A membrane-electrode assembly comprising the polymer electrolyte membrane of claim 18.

20. The poly(arylene ether) copolymer of claim 2, wherein: the copolymer is a random copolymer or block copolymer.

21. The poly(arylene ether) copolymer of claim 2, wherein: X is in the range of 0.1 to 0.9.

22. The poly(arylene ether) copolymer of claim 2, wherein: X is in the range of 0.2 to 0.8.

23. The poly(arylene ether) copolymer of claim 2, wherein: a weight average molecular weight is in the range of 10,000 to 1,000,000.

24. The poly(arylene ether) copolymer of claim 2, wherein: the weight average molecular weight is in the range of 30,000 to 800,000.

* * * * *